United States Patent

McCurley

[15] 3,680,672

[45] Aug. 1, 1972

[54] BRAKE FOR STOPPING A BROKEN DRIVEN SHAFT

[72] Inventor: Jack McCurley, Dallas, Tex.

[73] Assignee: LTV Electrosystems, Inc., Dallas, Tex.

[22] Filed: Aug. 17, 1970

[21] Appl. No.: 64,486

[52] U.S. Cl. ..................192/8 R, 192/3 R, 192/144
[51] Int. Cl. .......B60t 7/14, F16d 59/02, F16d 55/40
[58] Field of Search...192/3 R, 7, 8 R, 144; 188/134, 188/170

[56] References Cited

UNITED STATES PATENTS

| 444,102 | 1/1891 | Pratt | 192/8 R |
|---|---|---|---|
| 710,759 | 10/1902 | Coleman et al. | 188/134 UX |
| 2,404,615 | 7/1946 | Boyd | 192/8 R |
| 2,925,157 | 2/1960 | Davis | 192/8 R |
| 2,997,146 | 8/1961 | Chiolerio | 192/8 R |
| 3,208,565 | 9/1965 | Heckt | 192/3 R |

*Primary Examiner*—Allan D. Herrmann
*Attorney*—Walter J. Jagmin and James D. Willborn

[57] ABSTRACT

A control or brake apparatus for stopping or arresting rotation of a driven shaft which includes brake means operable hydraulicly to release the brake apparatus to permit rotation of the driven shaft and a releasable lock means operable upon the breaking of the driven shaft at a location between its connection with a driving shaft and the location of the application of a load to the driven shaft for releasing the brake to cause it to become operative and stop rotation of the brake to arrest rotation of the driven shaft, the hydraulic means being operably only when the pressure of fluid in a supply hydraulic fluid system exceeds a predetermined value.

16 Claims, 6 Drawing Figures

INVENTOR.
Jack McCurley
BY *Walter J Jay*
Attorney

INVENTOR.
Jack McCurley
BY Walter J Jagun
Attorney

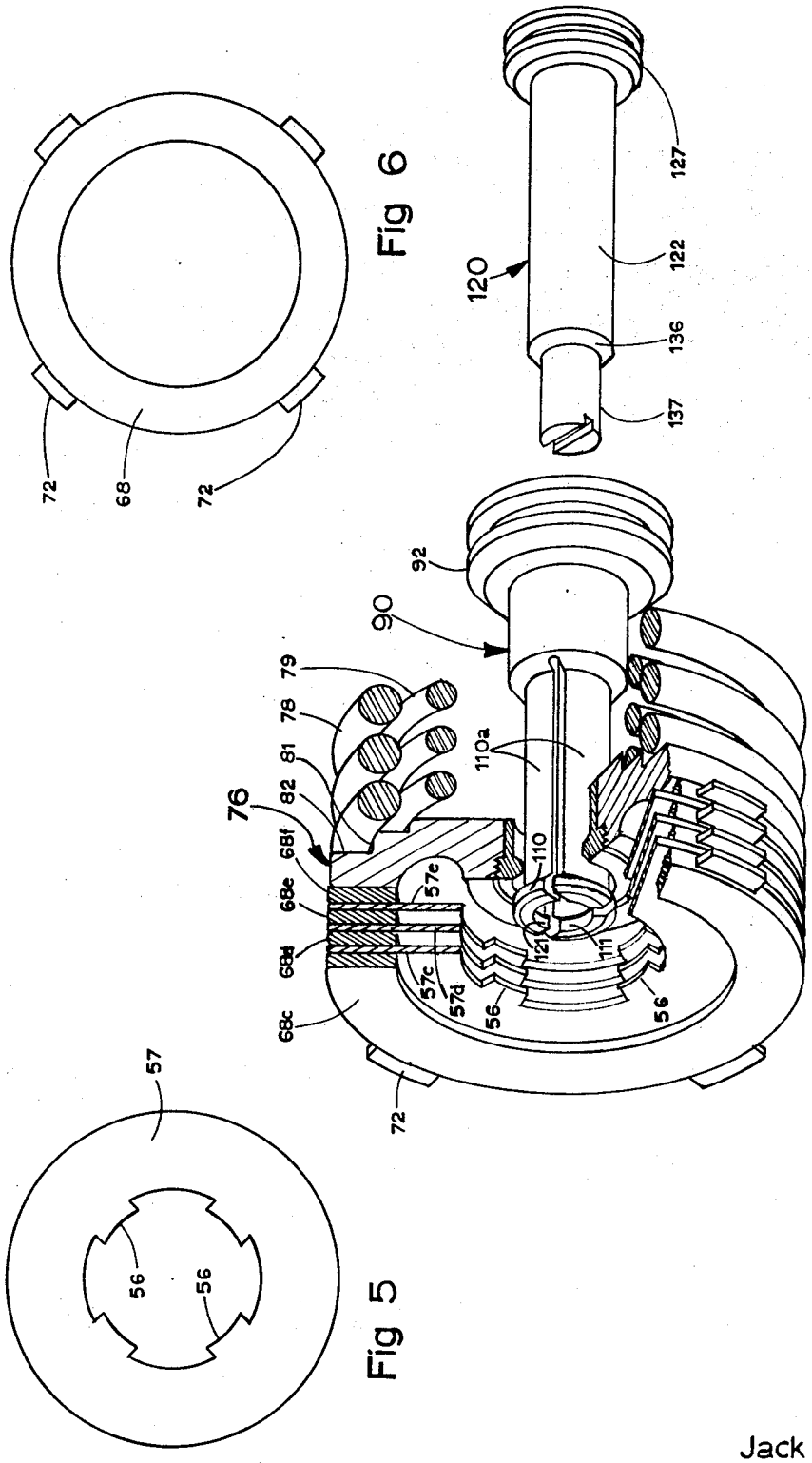

BRAKE FOR STOPPING A BROKEN DRIVEN SHAFT

This invention relates to control apparatus and more particularly to a control brake apparatus for selectively arresting rotation of a driven shaft.

An object of this invention is to provide a new and improved control apparatus for arresting rotation of a driven shaft upon the occurrence of one or more conditions making it necessary or desirable to stop rotation of the driven shaft.

Another object is to provide a control or brake apparatus for use in applications in which accidental breakage of a rotating driven shaft results in undesirable or dangerous lack of control of a control member, such as a stabilizer of an aircraft which is operated by a hydraulic motor whose output shaft drives the driven shaft which in turn is coupled by suitable means to the stabilizer, the brake apparatus being used to prevent dangerous uncontrolled movement of the stabilizer in the event of accidental breakage of the driven shaft or of malfunction of the hydraulic fluid pressure system of the aircraft.

Still another object is to provide a brake apparatus, of the type described, which may be operated by hydraulic fluid pressure to release or render the brake device inoperative and which has releasable lock means for causing automatic operation of the brake apparatus upon breakage of the driven shaft or of malfunction of the hydraulic system.

A further object is to provide a brake apparatus, of the type described, having a rotor connectible to the driven shaft for rotation therewith and braking means for rigidly connecting the rotor to the housing to arrest its rotation.

A still further object is to provide a brake apparatus, of the type described, wherein the means for arresting rotation of the rotor includes a plurality of rotor rings mounted non-rotatably and longitudinally movably on the rotor and a plurality of stator rings longitudinally movably but non-rotatably mounted in the housing, the stator and rotor rings having interdigitated or overlapped portions, a pressure plate and biasing means for causing the pressure plate to compress the overlapped portions of the rotor and stator rings to arrest rotation of the rotor rings.

Still another object is to provide a brake apparatus, of the type described, wherein the lock means are operable by sensor means operatively associated with the driven shaft and the driving shaft which drives such drive means to release the pressure plate for movement to its operative from its inoperative position upon the breakage of the driven shaft.

Still another object is to provide a brake apparatus wherein the lock means are resettable by fluid pressure.

Additional objects and advantages of the invention will be readily apparent from the reading of the following description of a device constructed in accordance with the invention, and reference to the accompanying drawings thereof, wherein:

FIG. 4 is an exploded fragmentary perspective view, with some parts shown in section, of some of the elements of the brake apparatus;

FIG. 5 is a plan view of one of the rotor brake rings; and,

FIG. 6 is a plan view of one of the stator brake rings.

Figure 1:
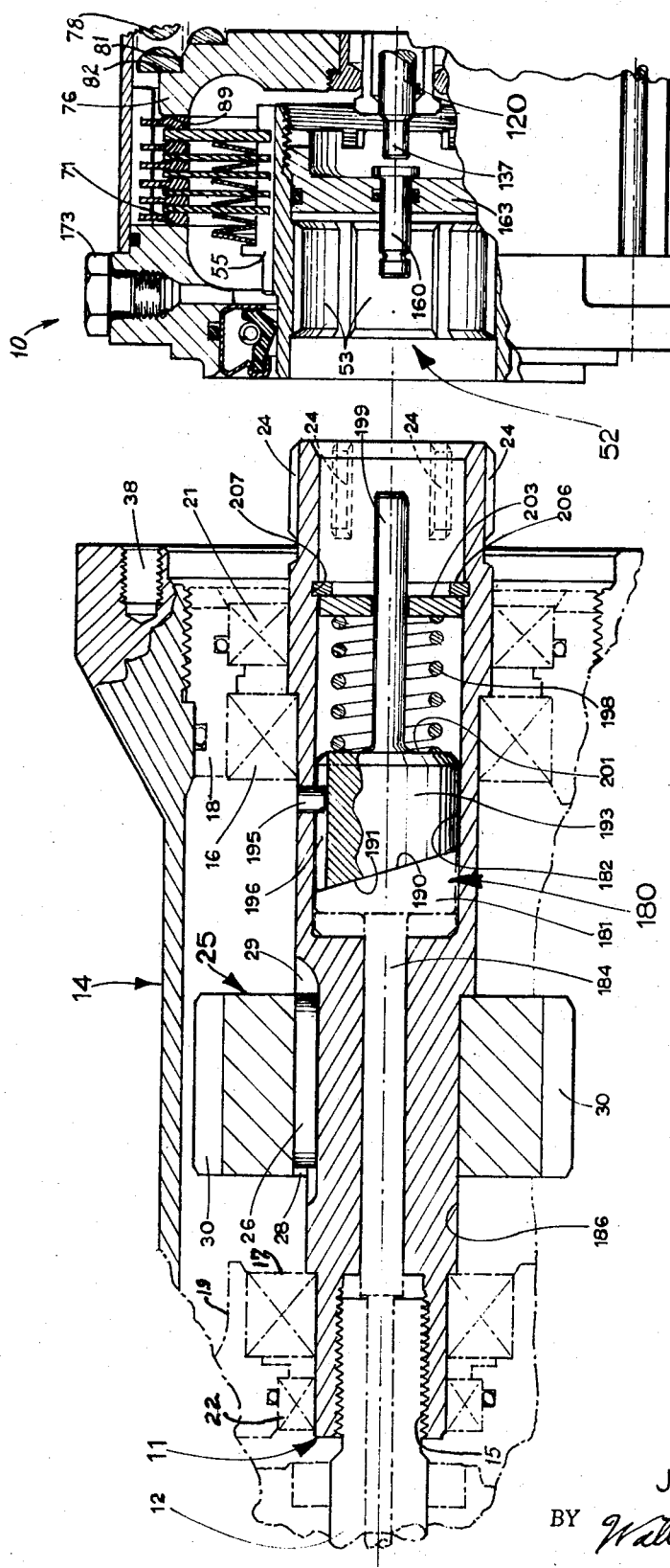
FIG. 1 is a partly sectional, partly exploded view, with some parts broken away, of a driven shaft and the control or brake apparatus embodying the invention.
Figure 3:
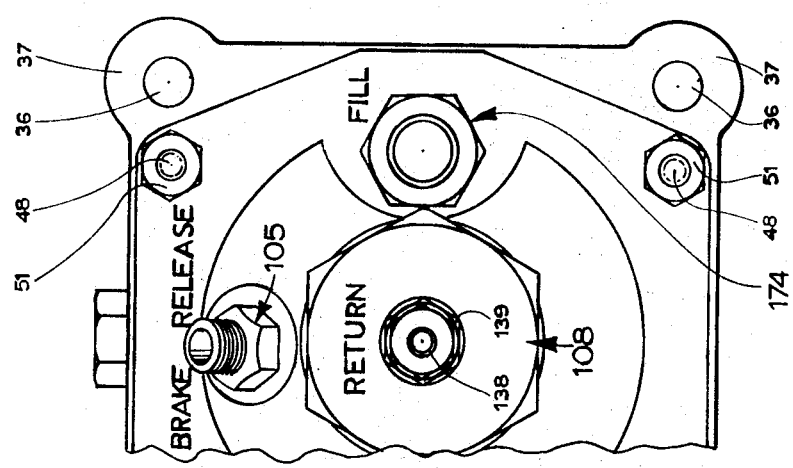
FIG. 3 is an end view of the brake apparatus.
Figure 2:
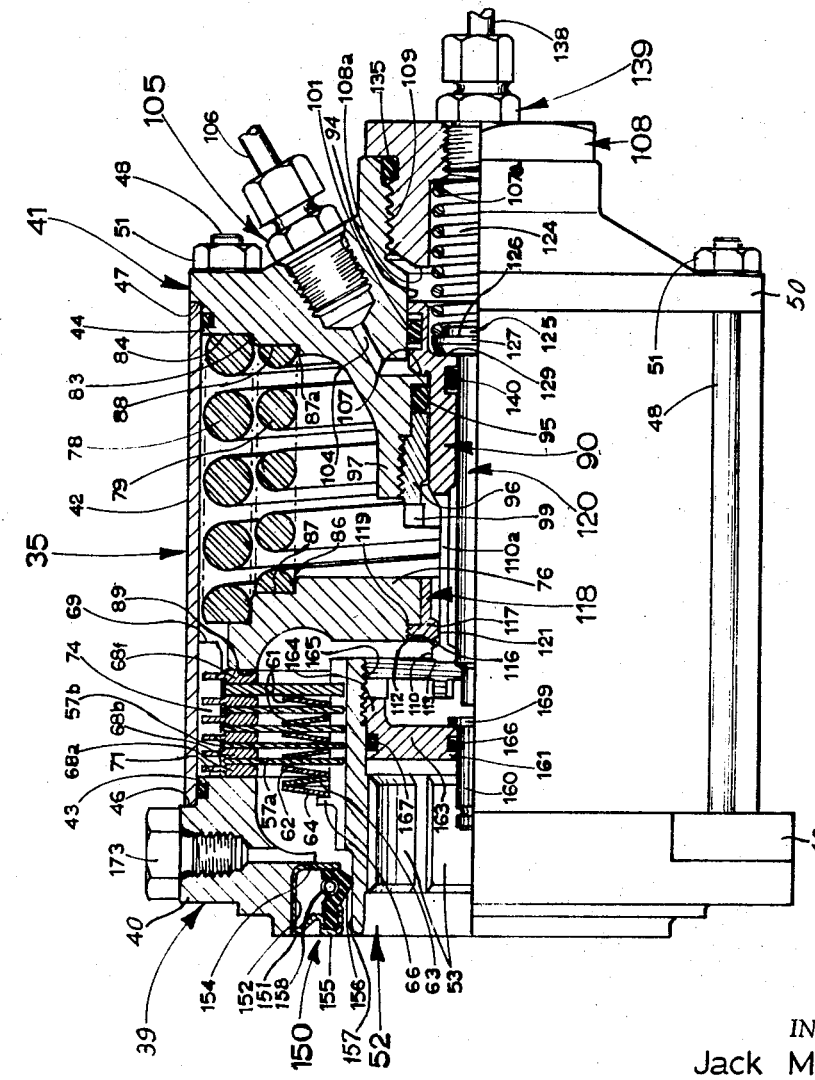
FIG. 2 is a quarter sectional view of the brake apparatus.

Referring now to the drawings, the fail safe brake assembly 10 embodying the invention is illustrated as used to arrest rotation of a driven shaft 11 driven by a driving shaft 12. The driving shaft may be the output shaft of a hydraulic motor and extends into a gear box or housing 14 and is rigidly connected at 15 to the tubular driven shaft 11 by any suitable means such as threads, splines or the like. The driven shaft 11 is suitably rotatably supported in the housing 14 by means of roller bearing assemblies 16 and 17 held in place by retainer members 18 and 19 threaded in opposite ends of the housing 14. Suitable seal assemblies 21 and 22 disposed outwardly of the bearing assemblies 16 and 17, respectively, may also be held in place by the tubular retainers 18 and 19 and the interior of the housing between the seal members 21 and 22 may be filled with a suitable lubricating fluid or oil. The driven shaft outwardly of the stationary gear box housing 14 has an outer end portion provided with splines 24 for purposes to be described below. An output gear 25 is mounted on the driven shaft by means of a key 26 which is received in aligned internal and external slots 28 and 29 of the gear and of the driven shaft, respectively. The output gear 25 of course has peripheral teeth 30 which are engageable with some other gear in the gear box, not shown, and which in turn is connected to a device controlled or operated by the output gear 25.

The brake assembly 10 is used to prevent rotation of the driven shaft either upon the occurrence of a drop in pressure of a hydraulic system, as will be explained below, or in the event of the breakage of the driven shaft 11 between the output gear 25 and the driving shaft 12, this portion of the driven shaft being subjected to the stresses and strains of the load imposed thereon. The brake assembly includes a housing 39 which is connectible to the stationary gear box or housing 14 by means of bolts which may extend through apertures 36 of the outwardly extending feet or lugs 37 of the brake housing into suitable threaded bores 38 in the end of the housing 14.

The brake housing includes an inner end section 40, an outer end section 41 and a middle cylindrical section 42. The middle section telescopes over the reduced inner end portions 43 and 44 of the end sections 40 and 41, respectively. Inward telescopical movement of the end sections into the middle section is limited by the engagement of their annular stop shoulders 46 and 47, respectively, with the annular end surfaces of the middle section.

The three housing sections are rigidly secured to one another by means of connector rods or bolts 48 rigidly secured to the inner end sections, as by being threaded in blind bores of external flanges 49 of the inner end section 40. The rods have threaded outer end portions extending through suitable apertures in the external flanges 50 of the outer end section and nuts 51 are threaded on the ends of the connector rods.

A cylindrical hub or rotor 52 is non-rotatably connectible to the outer end portion 24 of the tubular driven shaft 11 by means of the external splines 24 of the driven shaft and the internal splines 53 of the rotor. The brake rotor is disposed in the inner end section 40 and is provided with a plurality of external peripherally spaced longitudinal slots 55 in which are disposed the inner flanges 56 of a plurality of friction rings or discs 57a–57. THe rotor rings are resiliently biased away from one another by spring washers 61 disposed about the rotor and between each pair of adjacent rotor brake rings. The assembly of the rotor rings is also biased to the right, as seen in FIG. 1, by similar spring washers 62, 63 and 64 also mounted on the brake rotor, the washer 64 engaging an external flange 66 of the rotor and the washer 62 engaging the brake ring 57a.

The outer portions of the rotor brake rings extend between the inner portions of stator rings 68a–68f which are disposed in the end portion 69 of the inner end section 40 of the housing. Movement of the assembly of the rotor rings 57 and stator rings 68 to the left is limited by the engagement of the stator brake ring 68a with the internal annular stop shoulder 71 of the end housing section 40. The stator rings are provided with external flanges or lugs 72 which are received in the longitudinal slots 74 of the housing end section 40 and are slidably therein. It will be apparent that the rotor rings are held against rotation by the housing end section 40 while the rotor rings rotate with the rotor since they cannot rotate on the rotor but may move longitudinally thereon. The rotor and stator rings are formed of suitable substances and may have radial grooves therein so that when a longitudinal force is imposed on the rings by a pressure plate 76 forcing the rings together, the frictional engagement of the outer peripheral portions of the rotor rings with the stator rings will prevent rotation of the rotor rings and therefore of the brake rotor 52 and the driven shaft 11.

The pressure plate 76 is biased to the left by two coil springs 78 and 79. One end portion of the outer spring 78 extends about the annular external shoulder 81 of the pressure plate and bears against an annular stop surface 82 thereof while its other end portion extends about the annular external shoulder 83 of the housing end section 41 and bears against the shoulder 84. Similarly, the inner spring 79 has one end portion which extends about an inner longitudinally extending shoulder 86 of the pressure plate and bears against the annular stop surface 87 thereof while its other end portion extends about the external annular shoulder 87a of the end housing section 41 and bears against the annular stop surface 88 thereof.

The pressure plate is movable from its operative position illustrated in the drawing, wherein its annular shoulder 89 engages the innermost stator ring 68f and exerts a longitudinal compressive force on the assembly of rotor and stator rings to clamp them together and prevent rotation of the rotor rings between the stator rings, against the force exerted by the springs 78 and 79, by tubular operator piston 90 slidably mounted in the reducer inner end portion 91 of the housing outer end section 41. The operator piston has an external enlarged flange or outer end portion 92 which is slidable in the intermediate portion 94 of the outer section 41. An O-ring 95 seals between the housing outer end section and the operator piston 90 and is held by an annular nut or retainer 96 threaded in the inner end portion 97 of the outer end section. The nut 96 holds the O-ring in sealing engagement with the outer end section and the operator piston and may be provided with slots 99 in which teeth of a suitable tool are receivable for rotating the nut.

The operator piston flange 92 is provided with an external annular recess in which is disposed an O-ring 101 which seals between the flange and the intermediate portion of the housing outer end section. Hydraulic fluid under pressure is transmittable to the intermediate portion of the housing outer end section 41 inwardly of the operator piston flange by means of a passage 104 in whose enlarged outer end portion is receivable a connector 105 of the conduit 106 which is connectible to a source of fluid under pressure. Movement of the operator piston to the left is limited by the engagement of its flange with the annular stop shoulder 107 of the housing outer end section and to the right with the annular end shoulder or surface 108a of a nut 108 threaded, as at 109, in the outer end section 41.

The inner end portion of the piston 90 has a plurality of resilient collet fingers 110a provided with external bosses or dogs 110 and internal bosses or dogs 111. The external dogs have outwardly convergent shoulders 112 and 113. The shoulders 112 are engageable with the inwardly beveled cam surface 116 of an annular flange 117 of a cam ring 118. The cam ring has an external annular flange 119 which is threaded in an enlarged portion of the central aperture of the pressure plate.

The collet fingers are locked in their operative positions by a lock piston 120, which is slidably longitudinally in the tubular operator piston 90, due to the engagement of the inner surfaces 121 of their internal bosses 111 with the external lock surface 122 of the lock piston 120. The lock piston is biased toward its operative position illustrated in the drawings by a spring 124 which telescopes over a retainer projection 125 of the lock piston and engages the annular surface 126 of the annular end flange 127 thereof. Movement of the lock piston to the left is limited by the engagement of its flange with the internal annular surface 129 of the operator piston. The opposite end of the spring 124 bears against the internal annular stop surface 107a of an internal annular flange of the tubular nut 108. An O-ring 135 seals between the outer housing section and the nut 108.

The nut 108 is also internally threaded so that a conduit 138 may be connected thereto by means of a fitting or coupling 139 in order that fluid under pressure may be admitted to the outer end of the bore of the housing outer end section 41.

The operator piston has an internal annular recess in which an O-ring 140 is disposed to seal between the operator piston and the lock piston.

The outer ends of the collet fingers are released for inward movement towards retracted positions when the lock piston 120 is moved to the right against the resistance of the spring 124 as the annular shoulder 136 of the piston rod moves to the right of the inner surfaces 121 of the internal bosses 111 of the collet fingers and the reduced end portion 137 of the lock piston moves into alignment therewith. The camming engagement of the shoulders 112 of the external bosses 111 with the cam shoulder or surface 116 of the cam ring 118 then causes the collet fingers to be moved inwardly since the springs 78 and 79 bias the pressure plate to the left.

The inner end section 40 of the brake assembly housing 35 is closed by a seal assembly 150 which includes an annular seal holder 151 formed of a resilient metal whose outer portions are disposed in an internal recess or enlargement 152 of the inner end section, its inward movement being limited by the engagement of the retainer with the internal stop shoulder 154 of the inner end section. The retainer holds a resilient annular gasket or seal 155 having an annular portion 156 which engages the external seal surface 157 on the rotor and is held thereagainst by a garter spring 158.

The lock piston 120 is movable to its inoperative position by an actuator pin 160 which is slidably positioned in a central passage 161 of a stop disc 163 whose longitudinally extending annular flange 164 is threaded, as at 165, in the rotor 52. O-rings 166 and 167 mounted in suitable internal and external annular recesses of the stop disc seal between the stop disc and the actuator pin 160 and the rotor, respectively. The actuator pin has an external annular flange 169 which is adapted to engage the stop disc to limit its movement to the left.

It will be apparent that when the actuator pin 160 is moved to the right, it engages the end surface of the reduced end portion 137 of the lock piston and moves the lock piston to the right thus causing the reduced end portion 137 of the lock piston to move into alignment with the internal bosses 111 of the collet fingers to free the outer ends of the collett fingers for inward movement.

A suitable lubricating and heat conducting fluid may be introduced into the housing through one or both ports of the inner and outer sections of the housing which are closable by suitable plugs 173 and 174, respectively.

It will be apparent that such lubricating and heat conducting fluid will fill all spaces of the brake assembly housing between the end sections thereof.

The actuator pin 160 is moved, on relative rotation between the driven shaft 11 and the driving shaft 12 which occurs when the driven shaft breaks at a location between the output gear 25 and the location of connection of the driving shaft to the driven shaft, by a sensor means or cam assembly 180 which includes a cam member 181 rotatably disposed in the enlarged portion 182 of the central bore or passage of the tubular driven piston and having an extension 184 which extends through the reduced portion 186 of the bore of the driven shaft and is non-rotatably secured, as by splines or the like, to the driving shaft 12. The cam member 181 has an angled cam surface 190 which engages the similar cam surface 191 of the longitudinally movable cam member 193 of the cam assembly which is longitudinally slidably positioned in the enlarged portion 182 of the internal bore of the driven shaft and held against rotation therein by a pin 195 rigidly secured to the driven shaft and projecting inwardly into a longitudinal peripheral recess or slot 196 of the second cam member 193.

The cam member 193 is biased towards the cam member 181 by a spring 198 disposed about the extension or rod 199 of the cam member 193, which may be integral with the cam member, one of whose end portions bears against the annular shoulder 201 of the cam member 193 and whose other end portion bears against a stop ring 203 disposed in the enlarged portion 182 of the central bore of the driven shaft. The stop ring is held against movement to the right, as seen in FIG. 1, by a split lock ring 206 whose outer portions are received in a suitable internal annular recess 207 of the driven shaft and whose inner portions engage the stop ring 203.

It will be apparent that upon relative rotation of the drive shaft relative to the portion of the driven shaft in which the cam members 181 and 193 are positioned, the cam member 181 will rotate relative to the cam member 193. Such rotation of the cam member 181 due to the engagement of the cam surfaces 191 and 190 will cause the cam member 193 to be moved to the right as seen in FIG. 1 and strike the end of the actuator pin to cause it to move to the right.

The control apparatus or brake assembly 10 and the driven shaft with its camming or sensor means 180 are used in applications wherein the accidental breakage of a rotating driven shaft would result in undesirable or dangerous lack of control of a driven member. For example, they may be used in applications wherein the output gear 25 operates or moves a control member of an aircraft, as for example, the stabilizer of the tail assembly of an aircraft. If the driven shaft were to accidentally break, uncontrolled dangerous movement of the stabilizer could result with concomitant dangerous uncontrolled movement of the aircraft. The brake assembly 10 automatically stops such movement of the stabilizer upon the breakage of the driven shaft and allows the pilot of the aircraft to regain control of the aircraft. The brake assembly also stops such uncontrolled movement of the stabilizer if the hydraulic system of the aircraft, which powers the hydraulic motor whose output shaft is the drive shaft 12 illustrated in FIG. 1, for some accidental reason ceases to supply hydraulic fluid under pressure to the motor and to the brake assembly.

In use, the housing of the brake assembly 10 is secured rigidly to the housing 14 by means of bolts which extend through the apertures 36 of the flanges or lugs 27 of the brake assembly housing into the aligned threaded bores 38 of the gear box or housing 14. The right hand end portion of the driven shaft 11 is of course non-rotatably connected to the rotor 52 of the brake assembly, the splines of the driven shaft 24 engaging the internal splines 53 of the rotor. The conduit 106 is then connected to the hydraulic system of the aircraft through suitable control valves so that hydraulic fluid pressure may be selectively conducted to the brake assembly housing or allowed to vent therefrom. Similarly, the conduit 138 is also connectible to the hydraulic system of the aircraft through the conduit 138 which has suitable valves to permit selectively hydraulic fluid under pressure to be admitted into the brake housing through the conduit 138 or be permitted to vent therefrom.

The interior of the brake housing can be filled with a suitable lubricating and heat dissipating fluid such as is obtainable commercially under the trade mark "-Skydrol."

The extension 199 of the cam member 183 now engages the end of the actuator pin 160 but actuator pin will remain in the position illustrated in the drawings and is not moved to the right. The elements of the brake assembly will now be in the position illustrated in the drawings with the pressure plate 76 holding the rotor and stator rings or discs under longitudinal compression and in frictional engagement with one another so that the rotor 52 cannot rotate.

If it is now desired to release the brake assembly to permit rotation of the driven shaft 11, assuming that the hydraulic pressure system of the aircraft is operational, hydraulic fluid under pressure admitted by suitable control valves through the conduit 106 to the passage 104 of the housing 35 and at the same time hydraulic fluid is allowed to exhaust from the brake housing through the conduit 138. As a result the operator piston is now moved to the right by the hydraulic pressure exerted on the left facing areas of the operator piston 90 between the line of sealing engagement of the O-ring with the outer end section 41 and the line of sealing engagement of the O-ring 95 with the operator piston.

As the hydraulic piston 90 moves to the right, the lock piston 120 also moves therewith due to the engagement of the flange 127 with the shoulder 129 of the operator piston. During such movement of the lock and operator pistons to the right, the shoulders 112 of the external bosses 110 of the collet fingers 110a of the operator piston engage the cam surface 116 of the cam ring 117 and, since the outer ends of the collet fingers cannot now move inwardly, such movement of the operator piston also results in the pressure plate being moved to the right against the resistance of the springs 78 and 79. As the pressure plate moves to the right to its inoperative position, the spring washers 61, 72, 63 and 64 move the rotor rings apart and to the right. As each rotor ring moves to the right, it also moves the stator ring whose left side it engages to the right. The rotor rings and the stator rings are thus freed to move relative to each other.

Due to the engagement of the flange 92 with the end shoulder 101 of the nut 108, the movement of the operator piston and of the pressure plate to the right is so limited that the end surface 92 of the pressure plate limits movement of the stator ring 68f so that its flanges 72 cannot move out of the ends of the slots 74 of the housing inner end section 40. The operator can then start operation of the hydraulic motor having the drive shaft 12 and the driven shaft 11 may now be rotated in either direction by the hydraulic motor as determined either by the manual controls of a pilot or an automatic pilot control apparatus.

If the hydraulic pressure system of the aircraft which is supplying the hydraulic fluid under pressure to the hydraulic motor and to the brake assembly 10 malfunctions so that the hydraulic motor becomes inoperative, rotation of the driven shaft 11 is immediately arrested since once the pressure of hydraulic fluid supplied through the conduit 106 is decreased, the force of the springs 78 and 79, and also the force of the spring 124, is effective to move the pressure plate to its operative position illustrated in the drawings and the combined force of springs 78 and 79 now causes the rotor and stator rings to be moved to the left against the resistance of the spring washers mounted on the rotor and placed under compression.

If during operation the driven shaft 11 breaks between the location of its connection with the drive shaft 12 and its output gear 25, the drive shaft will of course continue to rotate while the driven shaft 11, since its output gear 25 is connected to a load, will tend to stop rotating. Alternatively, if the drive shaft is being held stationary by the hydraulic motor and the driven shaft breaks due to an excessive load being imposed thereon from the stabilizer, the driven shaft will be rotated in one direction or the other while the drive shaft remains stationary. In either case, rotation of one shaft relative to the other occurs and causes rotation between the cam members 181 and 193. As a result, the cam member 193 will be moved longitudinally to the right and moves the actuator pin 160 to the right causing it to engage the end surface of the reduced end portion of the lock piston 120 and move the lock piston to the right against the resistance of the spring 124. The lock piston is moved a distance sufficiently great that its shoulder 136 moves to the right of the internal bosses 111 of the collet fingers and its lock surface 122 moves out of engagement with the internal surfaces 121 of the internal bosses. The collet fingers then are no longer locked against inward movement. As a result, the combined force of the springs 78 and 79 acting on the pusher plate and the camming action of the cam shoulders 112 of the external bosses 110 and the cam surface 116 of the cam ring 118 now cause the free ends of the collet fingers to be flexed resiliently inwardly towards the reduced end portions of the lock piston. As the cam surface 116 moves out of engagement with the cam surface 112 of the external bosses, the pressure plate is released for movement to the left to its operative position where it again compresses the rotor and stator rings and thus arrests rotation of its rotor 52 and therefore of the driven shaft 11.

It will be apparent, of course, that the operator piston will continue to be held in its extreme right hand position by the hydraulic fluid under pressure transmitted through the conduit 106. The internal surface of flange 117 will now engage the outer surfaces of the external bosses 110 of the collet fingers and maintain the free ends of the collet fingers in their inner retracted position.

If it is thereafter desired to release the brake assembly to permit rotation of the driven shaft, as after the hydraulic motor has been placed in condition to rotate freely in either direction by the usual valve means associated with its hydraulic control circuit, the force of the spring 198 is effective to rotate the cam member 181 relative to the cam member 193 to the illustrated position so that the rod or extension 199 of the cam member no longer moves to position where it pushes the actuator rod 160 toward the right.

Hydraulic fluid is then permitted to flow outwardly through the conduit 106 and hydraulic fluid under pressure is transmitted through the conduit 138 to the right facing surfaces of the lock piston and the operator piston and the two pistons are then moved simultaneously to the left by the force exerted by the hydraulic fluid. As the operator piston moves to the left and the external surfaces of the external bosses 110 move out of engagement with the internal surface of the flange 117 of the cam ring 118 and to the left of the flange 117, collet fingers move resiliently outwardly to their normal positions permitting the lock piston 120 to move to the left relative to the operator piston and back to the position illustrated in the drawings where its outer surface 122 is engaged by the internal surfaces 121 of the internal bosses 111 of the collet fingers. The actuator rod is moved back to the left as the lock piston moves to the left.

Thereafter, the pressure plate 76 may again be moved to the right by admitting hydraulic fluid under pressure to the brake assembly through the conduit 106 to again cause the two pistons to move to the right and to cause the operator piston to move the pressure plate 76 to the right.

The pilot of the aircraft may then vary the force with which the pressure plate holds the rotor and stator rings in compression by varying the pressure of the hydraulic fluid transmitted through the conduit 106 and thus be able to control the stabilizer as by allowing it to move to a desired position by forces exerted thereon by air flowing therepast during the flight of the aircraft or by a second or redundant control means associated with such stabilizer.

It will now be seen that a new and improved control or brake apparatus has been illustrated and described for controlling rotation of a hollow driven shaft 11 rotatable in a first or shaft housing 14 and being connected to a driving shaft, such as the driving shaft 12 of a hydraulic motor, the shafts having sensor means, such as the cam assembly 180, operatively associated therewith and operable on relative rotation between the shafts.

It will further be seen that the control or brake apparatus includes a second brake or stator housing 35 rigidly securable to the shaft housing 14; a rotor 52 in the stator housing securable to the driven shaft for rotation therewith; first and second co-engagable means, such as the rotor rings or discs 57 and the stator rings or discs 68, mounted for longitudinal non-rotatable movement on the rotor and the stator housing, respectively; pressure means such as the pressure plate 76 and the springs 78 and 79 biasing the plate to its operative position wherein it exerts a compressive force on the rotor and stator rings to stop rotation of the rotor rings and of the rotor; and an operator means such as the operator piston 90 for moving the pressure means to its inoperative position and having lock means, such as the lock piston 120 which is operable by the sensor or cam means 180 for releasing the pressure means from the operator means for movement from its inoperative position to its operative position upon the operation of the sensor or cam means 180.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A control apparatus for a driven shaft rotatable in a first housing and having one end connected to a driving shaft and an opposite end extending outwardly of the first housing, the shafts having sensor means operatively associated therewith and operable on relative rotation of the driving shaft relative to said driven shaft, said control apparatus including: a stator housing rigidly securable to said first housing; a rotor in said stator housing securable to said opposite end of said driven shaft for rotation therewith; first and second co-engageable means mounted for longitudinal non-rotatable movement on said housing and said rotor, respectively; pressure means movable between an operative position wherein said pressure means holds said first and second means in compressive frictional engagement with one another for preventing rotation of said rotor and said driven shaft relative to said stator housing and an inoperative position wherein said first and second means are free for relative rotary movement relative to one another; operator means for moving said pressure means from said operative position toward said inoperative position and including releasable lock means, said lock means being operable by said sensor means upon rotation of one of said shafts relative to the other for releasing said pressure means from said inoperative position for movement to said operative position.

2. The apparatus of claim 1, wherein said first and second co-engageable means comprises rotor rings mounted on said rotor and a plurality of stator rings mounted on said stator, said stator and rotor rings having overlapping interdigitated portions, said pressure means comprising a pressure plate and first means biasing said pressure plate toward said operative position wherein said pressure plate holds said overlapped portions in compressed frictional engagement.

3. The apparatus of claim 2, wherein said operator means comprises an operator piston movable in said stator housing, said operator piston and said pressure plate having co-engageable holding means for moving said pressure plate from said operative position to said inoperative position upon movement of said piston in one direction; and means for introducing hydraulic fluid under pressure to said operator piston to move said operator piston in said one direction.

4. The operator apparatus of claim 3, wherein said operator piston is tubular and said lock means comprise a piston mounted for limited longitudinal movement in said operator piston and having means engageable with said holding means of said operator piston for holding said holding means of said operator piston in position engageable with said holding means of said pressure plate; and second biasing means biasing said lock piston to its operative locking position.

5. The apparatus of claim 4, wherein said lock piston is movable longitudinally in said one direction to permit movement of said holding means of said operator piston out of engagement with said holding means of said pressure plate to permit release of said pressure plate for movement from its inoperative position to its operative position.

6. The apparatus of claim 5, wherein said holding means of said operator piston comprise a plurality of resilient collet fingers having external bosses engageable with said pressure plate when said collet fingers are in expanded position, said lock piston and said collet fingers having means holding said collet fingers in said expanded position.

7. The apparatus of claim 6, wherein said bosses and said holding means have co-engageable cam means for moving said collet fingers inwardly when said lock piston is moved in said one direction and said pressure plate is moved toward its operative position by said first biasing means.

8. The apparatus of claim 7, and means for introducing hydraulic fluid under pressure to said pistons to move said pistons in a second direction opposite said one direction relative to said pressure plate when said pressure plate is in said operative position to cause said collet fingers to move to expanded position and said lock piston to hold said collet fingers in expanded position.

9. In combination: a driving shaft; a first housing; a driven shaft rotatable in said first housing and having one end connected to said driving shaft and an opposite end extending outwardly of the first housing, sensor means operatively associated with said shaft and operable on relative rotation of the driving shaft relative to said driven shaft, a stator housing rigidly secured to said first housing; a rotor in said stator housing securable to said opposite end of said driven shaft for rotation therewith; first and second co-engageable means mounted for longitudinal non-rotatable movement on said housing and said rotor, respectively; pressure means movable between an operative position wherein said pressure means holds said first and second means in compressive frictional engagement with one another for preventing rotation of said rotor and said driven shaft relative to said stator housing and an inoperative position wherein said first and second means are free for relative rotary movement relative to one another; operator means for moving said pressure means from said operative position toward said inoperative position and including releasable lock means, said lock means being operable by said sensor means upon rotation of one of said shafts relative to the other for releasing said pressure means from said inoperative position for movement to said operative position.

10. The apparatus of claim 9, wherein said first and second co-engageable means comprises rotor rings mounted on said rotor and a plurality of stator rings mounted on said stator, said stator and rotor rings having overlapping interdigitated portions, said pressure means comprising a pressure plate and first biasing means biasing said pressure plate toward said operative position wherein said pressure plate holds said overlapped portions in compressed frictional engagement.

11. The apparatus of claim 10, wherein said operator means comprises an operator piston movable in said stator housing, said operator piston and said pressure plate having co-engageable holding means for moving said pressure plate from said operative position to said inoperative position upon movement of said operator piston in one direction; and means for introducing hydraulic fluid under pressure to said operator piston for moving said operator piston in said one direction.

12. The operator apparatus of claim 11, wherein said operator piston is tubular and said lock means comprises a lock piston mounted for limited longitudinal movement in said operator piston and having means engageable with said holding means of said operator piston in position engageable with said holding means of said pressure plate, and second biasing means biasing said lock piston to its locking position.

13. The apparatus of claim 12, wherein said lock piston is movable longitudinally in said one direction to permit movement of said holding means of said operator piston out of engagement with said holding means of said pressure plate to permit release of said pressure plate for movement from its inoperative position to its operative position.

14. The apparatus of claim 13, wherein said holding means of said operator piston comprise a plurality of resilient collet fingers having external bosses engageable with said pressure plate when said collet fingers are in expanded position, said lock piston and said collet fingers having means holding said collet fingers in said expanded position.

15. The apparatus of claim 14, wherein said bosses and said holding means have co-engageable cam means for moving said collet fingers inwardly when said lock piston is moved in said one direction and said pressure plate is moved toward its operative position by said first biasing means.

16. The apparatus of claim 15, and means for introducing hydraulic fluid under pressure to said pistons to move said pistons in a second direction opposite said one direction relative to said pressure plate when said pressure plate is in said operative position to cause said collet fingers to move to expanded position and said lock piston to hold said collet fingers in expanded position.

* * * * *